US009088756B2

(12) United States Patent
Huang

(10) Patent No.: US 9,088,756 B2
(45) Date of Patent: Jul. 21, 2015

(54) SYSTEMS AND METHODS FOR CAMERA IMAGE CORRECTION AND WHITE BALANCING

(71) Applicant: Marvell World Trade Ltd, St. Michael (BB)

(72) Inventor: Samson Huang, Saratoga, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 44 days.

(21) Appl. No.: 14/022,678

(22) Filed: Sep. 10, 2013

(65) Prior Publication Data
US 2014/0092276 A1    Apr. 3, 2014

Related U.S. Application Data

(60) Provisional application No. 61/708,854, filed on Oct. 2, 2012.

(51) Int. Cl.
*H04N 9/73* (2006.01)
*H04N 5/222* (2006.01)
*H04N 17/00* (2006.01)

(52) U.S. Cl.
CPC ............. *H04N 9/735* (2013.01); *H04N 17/002* (2013.01)

(58) Field of Classification Search
CPC ..... H04N 9/735; H04N 5/2354; H04N 9/045; H04N 9/68; H04N 9/73; H04N 1/6086; H04N 2209/046
USPC ........................... 348/223.1, 225.1, 371, 370
See application file for complete search history.

(56) References Cited

U.S. PATENT DOCUMENTS

| 2002/0130959 | A1* | 9/2002 | McGarvey | 348/223 |
| 2003/0052980 | A1 | 3/2003 | Brown et al. | |
| 2007/0058223 | A1* | 3/2007 | Matsuura | 358/518 |
| 2010/0066857 | A1 | 3/2010 | Ovsiannikov | |

OTHER PUBLICATIONS

International Search Report and Written Opinion dated Mar. 21, 2014 from related/corresponding International PCT Patent Appl. No. PCT/IB2013/002736 filed Sep. 10, 2013.

\* cited by examiner

*Primary Examiner* — Tuan Ho
*Assistant Examiner* — Selam Gebriel

(57) ABSTRACT

Systems and methods are provided for calibrating a digital camera. First pixel values of a first calibration image illuminated by white light are captured using a color sensor. A color sensor adjustment matrix is determined based on a comparison of the first pixel values and baseline pixel values associated with the calibration image. Second pixel values of a second calibration image illuminated by a first color temperature light are captured. The second pixel values are adjusted based on the color sensor adjustment matrix, and a first color temperature balance factor is determined based on the adjusted second pixel values, where a white balance adjustment is performed on captured image data based on the first color temperature balance factor.

27 Claims, 8 Drawing Sheets ures of calibration images 108 having known characteristics. Such image adjustment parameters are stored in the memory 110 and are utilized by the data processor 112 in adjusting raw

SYSTEMS AND METHODS FOR CAMERA IMAGE CORRECTION AND WHITE BALANCING

CROSS-REFERENCE TO RELATED APPLICATIONS

This application claims priority to U.S. Provisional Patent Application No. 61/708,854, filed Oct. 2, 2012 entitled "Camera Image Correction and White Balancing," which is herein incorporated by reference in its entirety.

FIELD

The technology described herein relates generally to photographic image capture and more particularly to photographic image capture processing.

BACKGROUND

When a picture is taken using a digital camera, typically red, green, and blue (RGB) pixel values are captured by respective sensors. Depending on a light source, coloring of certain objects may appear off. For example, when a white or gray object is illuminated with a low color temperature light source, the object in the captured image may appear reddish in color. Similarly, when a white or gray object is illuminated with a high color temperature light so the object in the captured image may appear bluish in color. A white balancing process, as described herein, is used to improve the quality of the captured image.

SUMMARY

Examples of systems and methods are provided for calibrating a digital camera. First pixel values of a first calibration image illuminated by white light are captured using a color sensor. A color sensor adjustment matrix is determined based on a comparison of the first pixel values and baseline pixel values associated with the calibration image. Second pixel values of a second calibration image illuminated by a first color temperature light are captured. The second pixel values are adjusted based on the color sensor adjustment matrix, and a first color temperature balance factor is determined based on the adjusted second pixel values, where a white balance adjustment is performed on captured image data based on the first color temperature balance factor.

As another example, a digital camera includes a raw age capture module configured to capture image data based on a command. The camera further includes a memory, where the memory contains a color sensor adjustment matrix, where the color sensor adjustment matrix contains data that is based on a comparison of captured first pixel values of a first calibration image illuminated by white light using a color sensor and baseline pixel values associated with the calibration image. The memory further contains a first color temperature balance factor, where the first color temperature balance factor is based on captured second pixel values of a second calibration image illuminated by a first color temperature light that is adjusted based on the color sensor adjustment matrix. The camera further includes a data processor configured to adjust image data captured by the raw image capture module based on the first color temperature balance factor.

As a further example, a method of adjusting a captured image includes receiving captured image data captured by a digital camera. A color sensor adjustment of the captured image data is performed using a color sensor adjustment matrix, wherein the color sensor adjustment matrix contains data that is based on a comparison of previously captured first pixel values of a first calibration image illuminated by white light using a color sensor and baseline pixel values associated with the calibration image. A white balance adjustment of the captured image data is performed using a color temperature balance factor, wherein the color temperature balance factor is based on previously captured second pixel values of a second calibration image illuminated by a given color temperature light that is adjusted based on the color sensor adjustment matrix. The adjusted captured image data is saved in a computer-readable memory.

DETAILED DESCRIPTION

Figure 1:
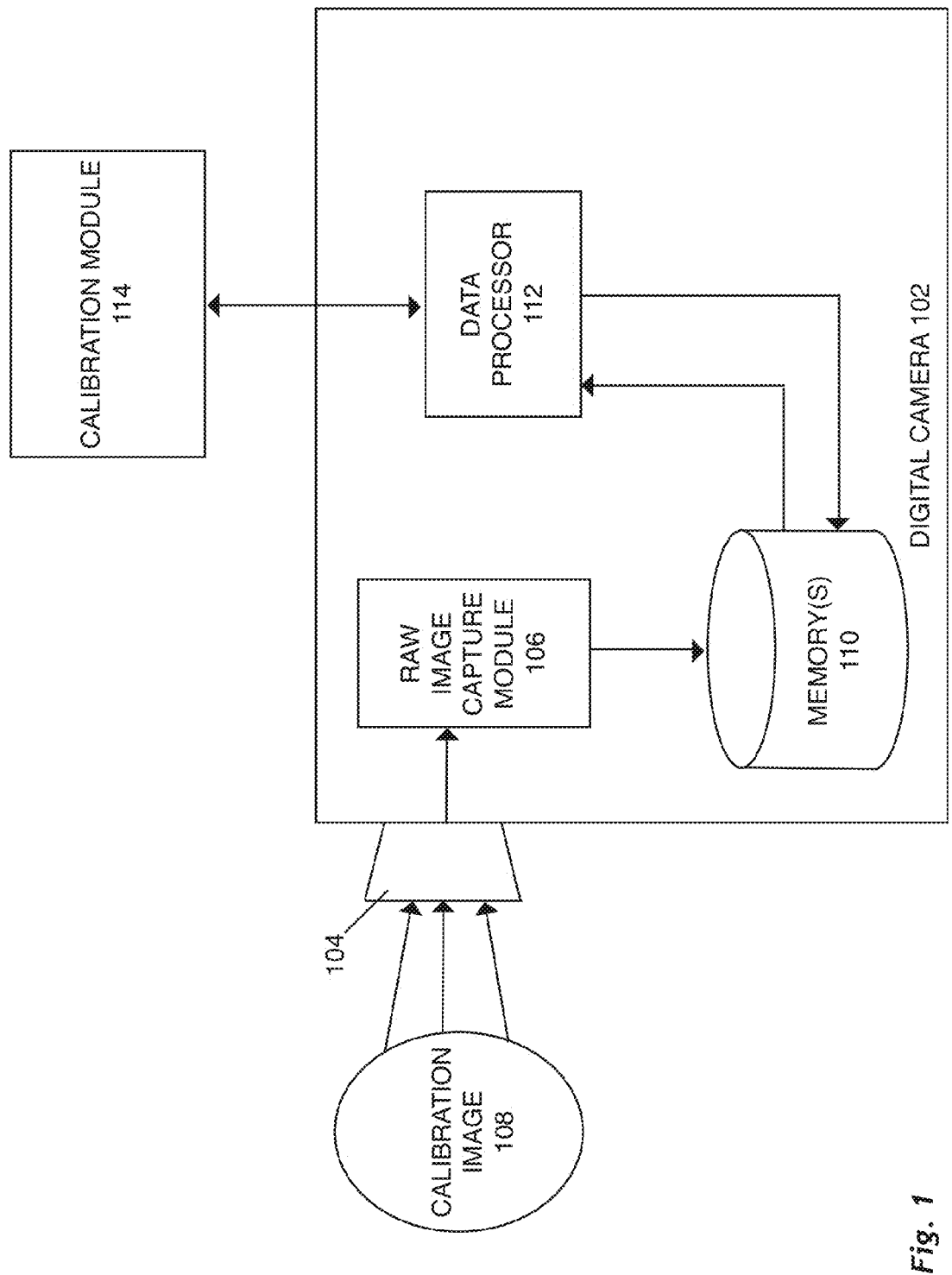
FIG. 1 is a block diagram depicting a digital camera having parameters adjusted by a calibration module.

FIG. 1 is a block diagram depicting a digital camera having parameters adjusted by a calibration module. A digital camera 102 having a lens 104 and a raw image capture module 106 "takes pictures" to capture raw image data associated with one or more calibration images 108. That raw image data is stored as a plurality of pixel values in a memory 110. Typically, a pixel value includes one or more of a red value, a green value, and a blue value for each pixel location in an array of pixel locations that make up the picture. A data processor 112 is responsive to the memory 110 for accessing the raw image data.

Oftentimes, the quality of a picture produced from the raw image data alone is sub-optimal for a variety of reasons. For example, imperfections in the raw image capture module 106 can have an adverse affect on a generated picture. As another example, environmental factors, such as the type of light illuminating a subject of a picture can also have an effect on picture quality. In a production mode, the data processor 112 is configured to adjust the raw image data with the intent to output an adjusted image that is pleasing to a viewer. In one example, the data processor 112 is configured perform a color adjustment and a white balance adjustment to the raw image data to generate the adjusted image. That adjusted image is saved in the memory 110, where the adjusted image can be subsequently accessed or exported by a user.

In a calibration mode, the data processor 112 works in conjunction with a calibration module 114 to set certain image adjustment parameters, such as through image captures of calibration images 108 having known characteristics. Such image adjustment parameters are stored in the memory 110 and are utilized by the data processor 112 in adjusting raw image data when the camera is in the production mode. In one example, the adjustment parameters includes a color sensor adjustment matrix that is used by the data processor 112 in performing a color adjustment, and the adjustment parameters further include one or more color temperature balance factors used by the data processor in performing a white balance adjustment.

Figure 6:
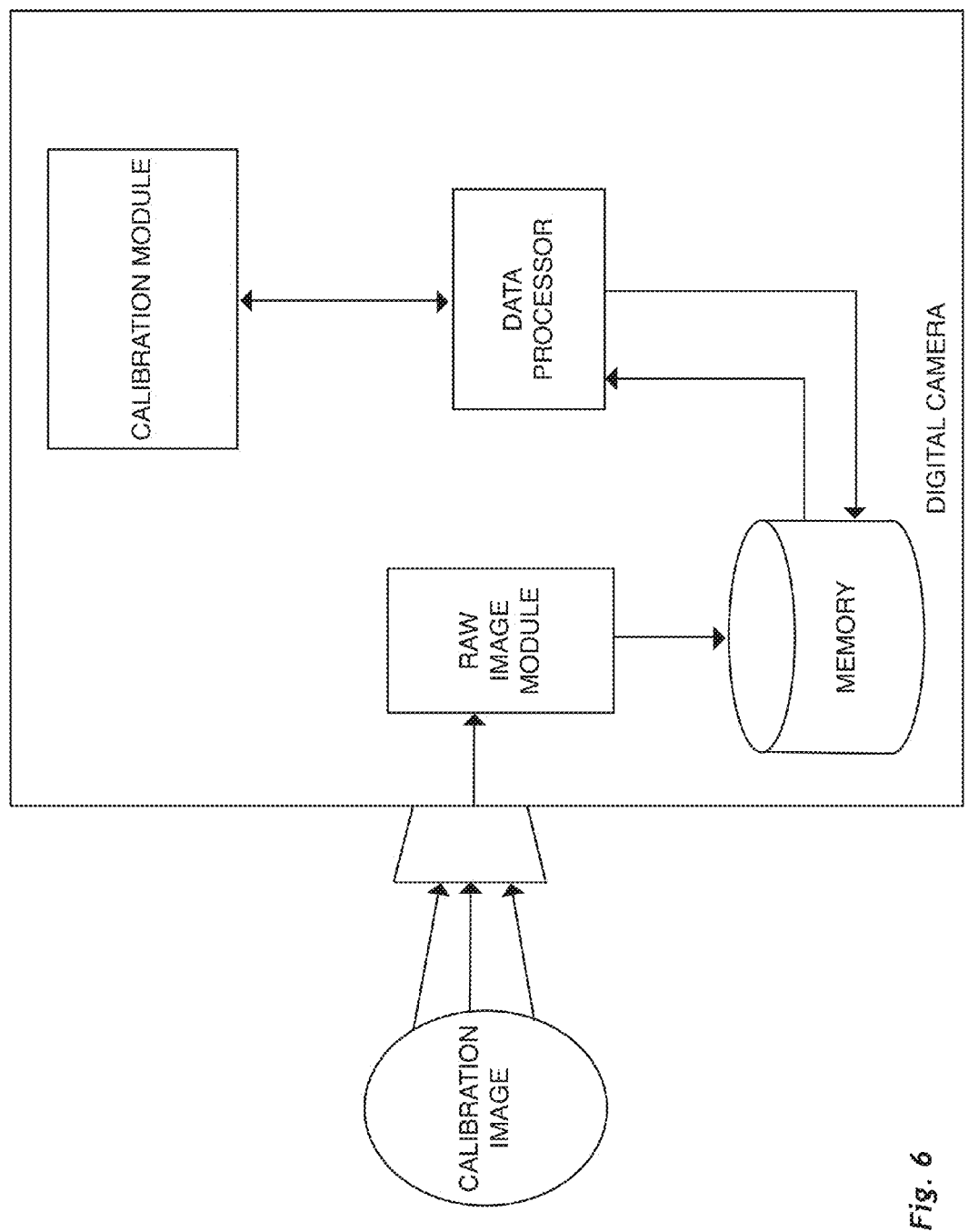
FIG. 6 is a block diagram depicting a digital camera having an internal calibration module.

Calibration of the digital camera 102 can be performed in a variety of ways. In an environment where a camera manufacturer is confident of the consistency of certain camera 102 hardware (e.g., lens 104, raw image capture module 106) across a plurality of manufactured cameras, calibration can be performed once or a sample of times for a number of cameras (e.g., a production batch, a number of cameras having hardware from a common production batch). In such an environment, the adjustment parameters are determined by performing calibration for one camera or a sample of cameras, and those adjustment parameters are loaded into the memories 110 of a larger number of manufactured cameras. In that environment, an external calibration module 114 may be used because calibration is not performed for many of the individual manufactured digital cameras. In another example, calibration is performed for each digital camera to determine adjustment parameters that are specific to that digital camera. In that case, an external calibration module 114 may be used or each camera may include an internal calibration module, as depicted in FIG. 6.

Figure 2:
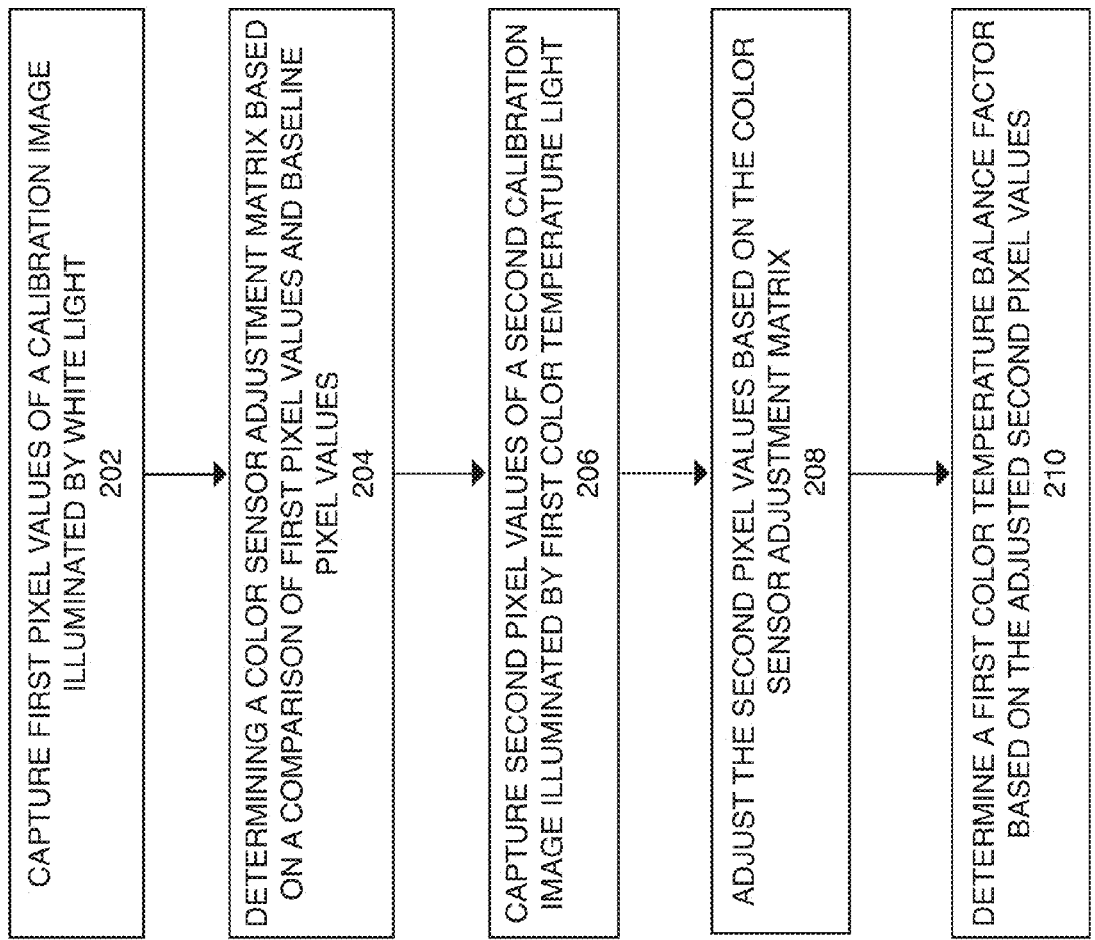
FIG. 2 is a flow diagram depicting steps of an example method of calibrating a digital camera, such as through the use of a calibration module.

FIG. 2 is a flow diagram depicting an example method of calibrating a digital camera, such as through the use of a calibration module. The method begins by determining parameters of a color sensor adjustment matrix. At 202, first pixel values of a first calibration image are captured using a color sensor, where the first calibration image is illuminated by white light (e.g., a D50 light having a color temperature of 5000K°). By illuminating the first calibration in white light, the color temperature of the illuminating light has no effect on the captured color of the first calibration image. Such illuminating results in a control case, where any color imperfection in the first pixel values is due to imperfections in camera hardware, such as a raw image capture module.

Figure 3:
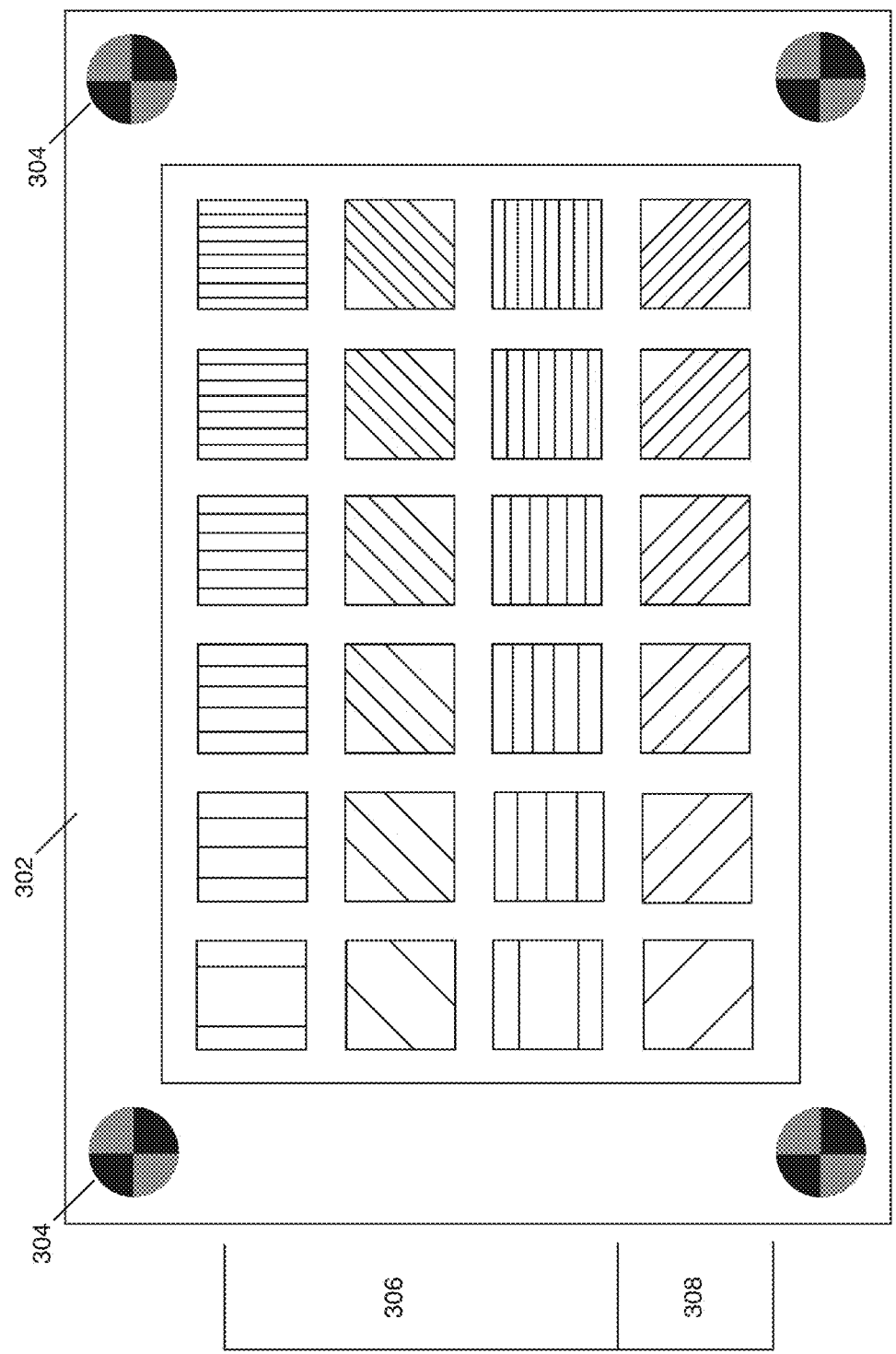
FIG. 3 is a depiction of an example calibration image.

The calibration image has known properties. FIG. 3 is a depiction of an example calibration image. The calibration image 302 includes alignment aids 304 at each of the corners. The calibration image further includes four rows of color panels, where each of the panels includes a different color. In the example of FIG. 3, the top three rows 306 of panels depict different colors, while the bottom row 308 of panels depicts varying degrees of grayscale. Certain parameters of the calibration image are known. In one example, correct, baseline red, green, and blue pixel values are known for each of the panels of the calibration image. These known calibration image baseline parameters are used in determining adjustment parameters for cameras.

With reference back to FIG. 2, having captured the calibration image illuminated in white light, any differences between the captured first pixel values and the baseline pixel values associated with the calibration image are caused by imperfections in the color sensor. At 204, a color sensor adjustment matrix is determined based on a comparison of the captured first pixel values and the baseline pixel values associated with the calibration image. In one example, red, green, and blue values are extracted from the captured first pixel values for each of a plurality of panels of a calibration image, such as the calibration image of FIG. 3. Those measured red, green, and blue values are used to populate a matrix:

$$P = \begin{pmatrix} 1 & Rp1 & Gp1 & Bp1 \\ 1 & Rp2 & Gp2 & Bp2 \\ 1 & Rp3 & Gp3 & Bp3 \\ \vdots & \vdots & \vdots & \vdots \\ \vdots & \vdots & \vdots & \vdots \\ 1 & Rpn & Gpn & Bpn \end{pmatrix}, n = 24$$

where each row contains the measured red, green, and blue values for one of the 24 panels in the calibration image, where a value of 1 is inserted at the beginning of each row as a DC offset. The baseline pixel values are similarly used to populate a second matrix:

$$O = \begin{pmatrix} Ro1 & Go1 & Bo1 \\ Ro2 & Go2 & Bo2 \\ Ro3 & Go3 & Bo3 \\ \vdots & \vdots & \vdots \\ \vdots & \vdots & \vdots \\ Ron & Gon & Bon \end{pmatrix}, n = 24$$

where each row contains the correct, baseline red, green, and blue values for one of the 24 panels in the calibration image. A color sensor adjustment matrix A is then determined by solving $$O \approx P \times A,$$

where A is a 4-by-3 matrix. The color sensor adjustment matrix A can be solved for in a variety of ways, such as according to a least square optimization:

$$A = (P^T \times P)^{-1} \times P^T \times O.$$

The color sensor adjustment matrix A can then be used to perform an adjustment of pixel data for color sensor imperfections.

Having determined the color sensor adjustment matrix, the method of FIG. 2 continues its calibration operations to determine one or more color temperature balance factors for use in performing white balance adjustments. At 206, a second calibration image is illuminated by a first color temperature light of a known temperature. The second calibration image may be the same image as the first calibration image or the second calibration image may be a different image. In one example, the second calibration includes only the grayscale panels of the fourth row 308 of the calibration image 302 depicted in FIG. 3.

At 208, the second pixel values are adjusted based on the color sensor adjustment matrix, such as according to:

$$S = P_S \times A,$$

where S is a matrix containing the adjusted second pixel values, $P_S$ is a matrix containing the captured second pixel values for each of the one or more utilized panels of the second calibration image, and A is the color sensor adjustment matrix. This operation adjusts the second pixel values for any imperfections in the color sensors of the camera. The adjusted second pixel values have then been controlled for those imperfections in the color sensors, and variances between the adjusted second pixel values and baseline values for the second calibration image panel pixel values are due to the illumination by the first color temperature light. At 210, a first color temperature balance factor for the first color temperature light is determined based on the adjusted second pixel values. In one example, only grayscale panels in the second calibration image are utilized. Grayscale images are expected to have equal red, green, and blue pixel values. In that example, the first color temperature balance factor can be determined by calculating an amount of adjustment necessary to best equalize the red, green, and blue pixel values across the one or more grayscale panels of the second calibration image. In another example, the first color temperature balance factor is determined by comparing the adjusted second pixel values and the baseline red, green, and blue values for panels of the second calibration image. The first color temperature balance factor that is associated with the first color temperature light used to illuminate the second calibration image is stored for utilization in white balancing adjustments of pictures taken by a camera in production mode. For example, the red, green, and blue values of a captured image of a subject illuminated by the first color temperature light can be adjusted according to the first color temperature balance factor to improve the captured image.

Operations 206, 208, and 210 can be repeated multiple times to generate additional color temperature balance factors, where each of the color temperature balance factors is associated with a different calibration color temperature light used to illuminate the second calibration image at 206. The multiple color temperature balance factors (e.g., one for each of one or more of a Hor light source, an A light source, a CW light source, a D50 light source, and a D65 light source) are then used to adjust images captured by the camera in production mode. In one example, the camera is configured to detect a color temperature illuminating a subject of a captured image. The camera selects a color temperature balance factor associated with a calibration color temperature light closest to the detected color temperature. In another example, the camera selects two color temperature balance factors associated with two calibration color temperature lights closest to the detected color temperature. A data processor of the camera interpolates between the two selected color temperature balance factors to generate a composite color temperature balance factor that is used to perform a white balance adjustment on the captured image.

Figure 4:
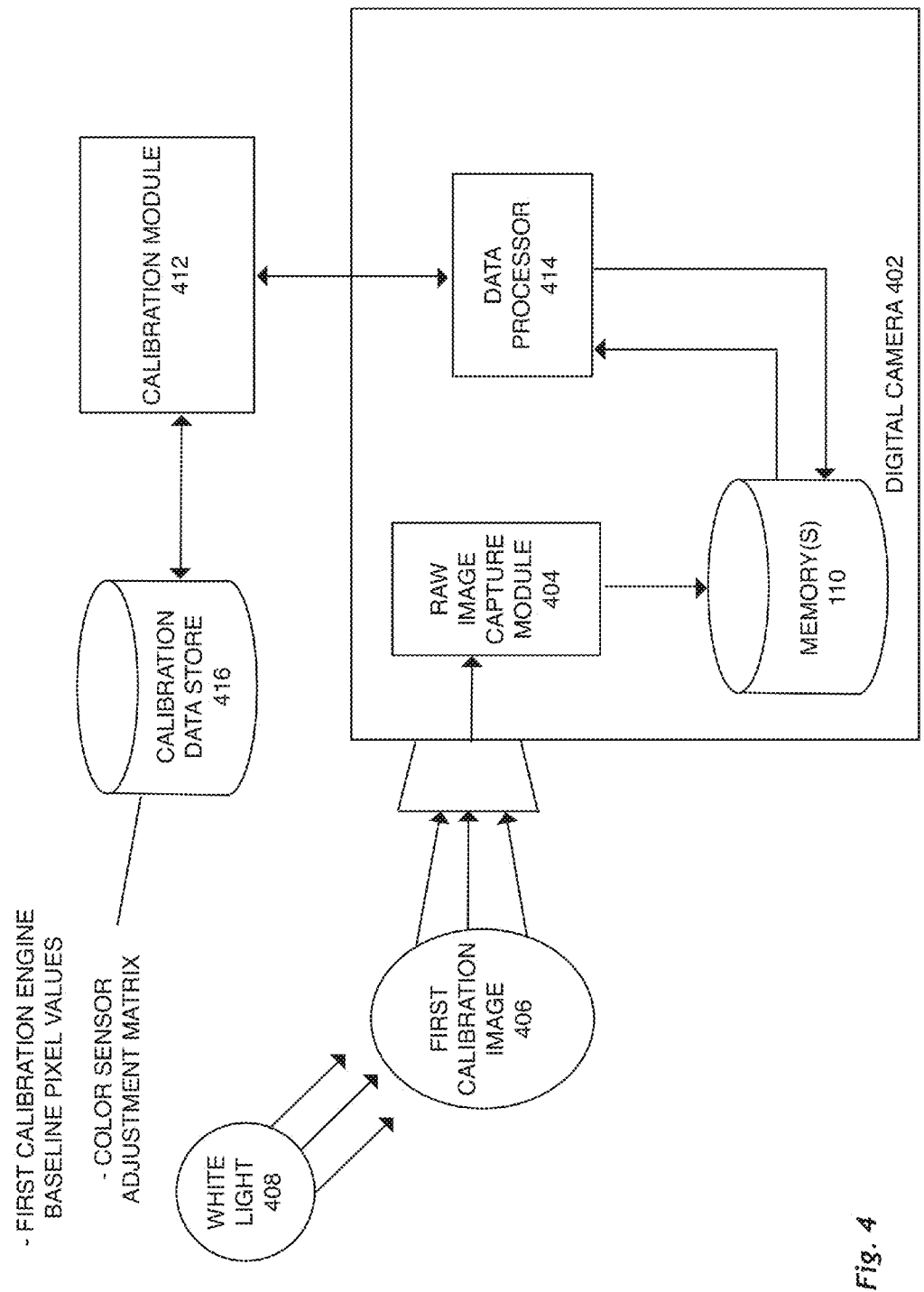
FIG. 4 is a block diagram depicting a camera and calibration module calibrating a digital camera by determining a color sensor adjustment matrix.

FIG. 4 is a block diagram depicting a camera and calibration module calibrating a digital camera by determining a color sensor adjustment matrix. The camera 402 includes a raw image capture module 404. The raw image capture module 404 captures first pixel values of a first calibration image 406 that is illuminated by white light 408. The first pixel values are stored in a memory 410. A calibration module 412, alone or in conjunction with a data processor 414, accesses the first pixel values for processing. The calibration module 412 further receives baseline pixel values associated with the first calibration image 406, such as from a calibration data store 416. The calibration module 412, which may take the form of a physical module or a software code module running on the camera 402 or an external computer system, processes the first pixel values and the baseline pixel values associated with the calibration image, such as through one of the processes described with respect to FIG. 2, to generate a color sensor adjustment matrix. That color sensor adjustment matrix is stored in the calibration data store 416 for subsequent uses, such as in additional calibration operations as well as image adjustment operations on a camera running in production mode.

Figure 5:
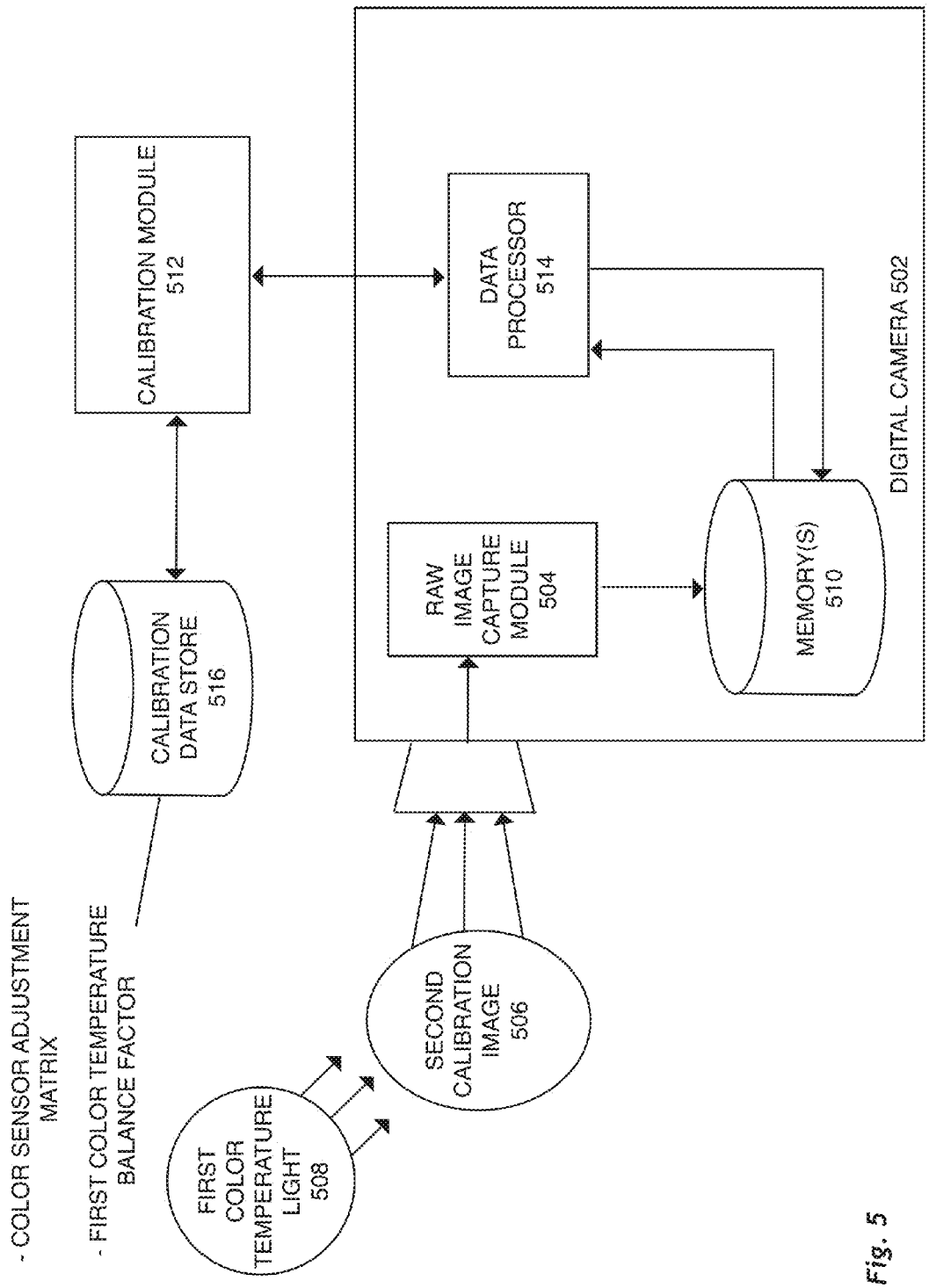
FIG. 5 is a block diagram depicting a camera and calibration module calibrating a digital camera by determining a color temperature balance factor using pixel values adjusted using a color sensor adjustment matrix.

FIG. 5 is a block diagram depicting a camera and calibration module calibrating a digital camera by determining a color temperature balance factor using pixel values adjusted using a color sensor adjustment matrix. The camera 502 includes a raw image capture module 504. The raw image capture module 504 captures second pixel values of a second calibration image 506 that is illuminated by first color temperature light 508. The second pixel values are stored in a memory 510. A calibration module 512, alone or in conjunction with a data processor 514, accesses the second pixel values for processing. The second pixel values are adjusted based on the color sensor adjustment matrix, such as the color sensor adjustment matrix determined in the example of FIG. 4, which is accessed, for example from a calibration data store 516. After adjusting the second pixel values using the color sensor adjustment matrix, the calibration module 512 determines a first color temperature balance factor based on the adjusted second pixel values.

The color sensor adjustment matrix and/or first color temperature balance factor are provided for storage on the memory of the camera 510, and in some implementations, other cameras, and are used in providing color sensor adjustments and white balance adjustments of captured images in a production mode. In one example, a camera captures image data and detects that the subject of the image was illuminated by light of the first color temperature. The camera adjusts the captured image data based on the color sensor adjustment matrix and then further adjusts the captured image data based on the first color temperature balance factor to provide an improved picture.

FIG. 6 is a block diagram depicting a digital camera having an internal calibration module. In the example of FIG. 6, each camera includes a calibration mode where either or both of a color sensor adjustment matrix and a color temperature balance factor are determined specifically for the camera on which the calibration module is included. Implementations where individual digital cameras are calibrated enable adjustment parameters to be tailored to the specific hardware in each digital camera.

Figure 7:
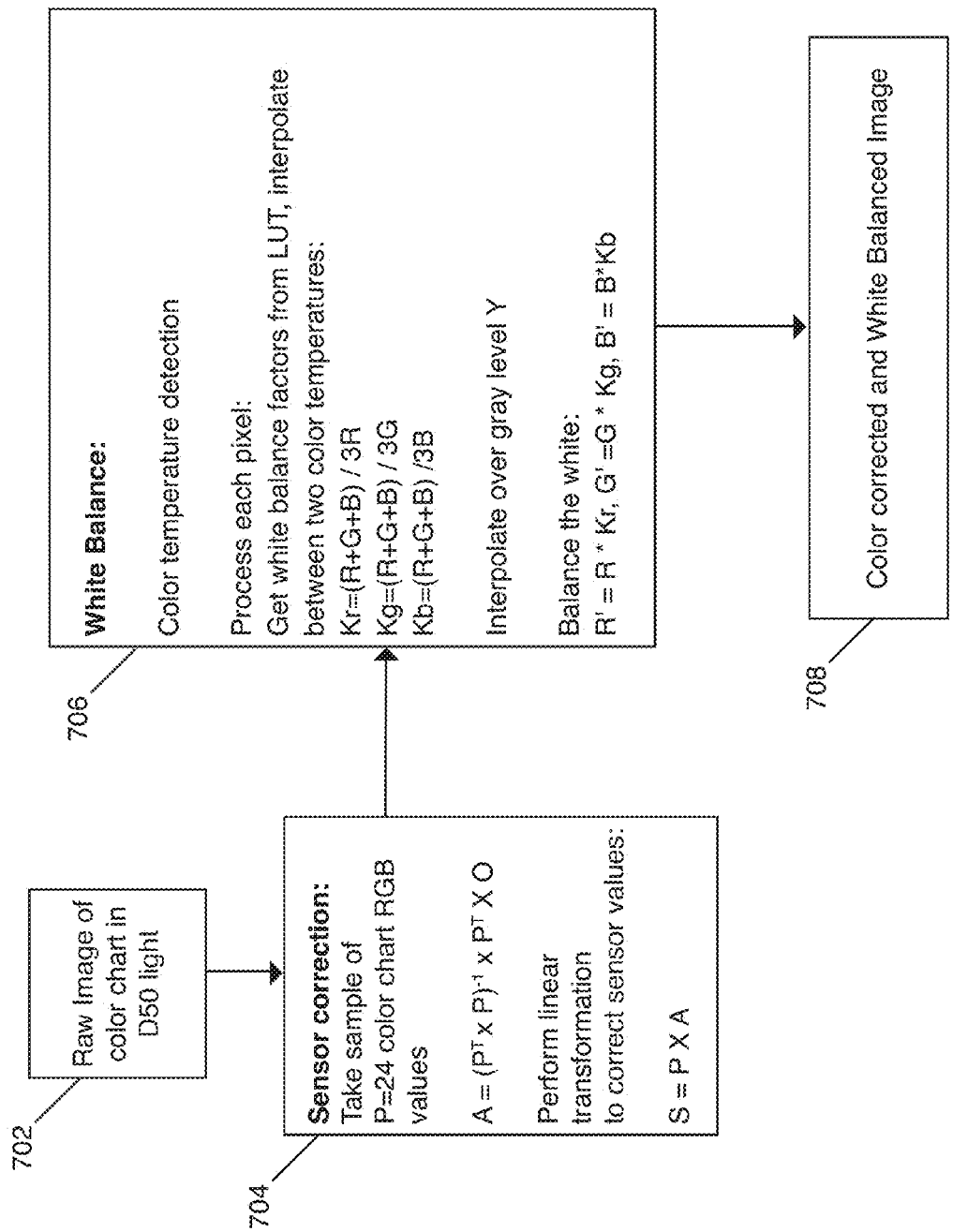
FIG. 7 is a flow diagram depicting an example method of calibrating a digital camera.

FIG. 7 is a flow diagram depicting an example method of calibrating a digital camera. At 702, a raw image of a color chart calibration image that illuminated in D50 is captured. At 704, a sensor correction operation is performed. There, samples of RGB values for each of 24 panels on the color chart are taken and compared to baseline RGB values for those panels to determine a color sensor adjustment matrix according to:

$$A = (P^T \times P)^{-1} \times P^T \times O.$$

Having determined the color sensor adjustment matrix, captured images, both calibration and production, can be adjusted to compensate for camera hardware error according to $S = P \times A$.

A white balancing operation for a captured image is illustrated at 706. The example white balancing operation begins with a color temperature detection. Upon detecting a color temperature of the captured image, the white balancing operation 706 accesses a lookup table containing white balance factor records, where each of the white balance factor records is associated with a color temperature. The white balancing operation 706 identifies which two white balance factor records are associated with color temperatures closest to the detected color temperature of the captured image. The white balancing operation 706 interpolates between those two white balance factor records to determine white balancing factors (Kr, Kg, Kb) specific to the captured image's detected color temperature. The interpolated color balance factors are applied to the Red, Green, and Blue values of pixels of the captured image to generate an image that is color corrected according to $S = P \times A$ and white balanced according to the process at 706.

Figure 8:
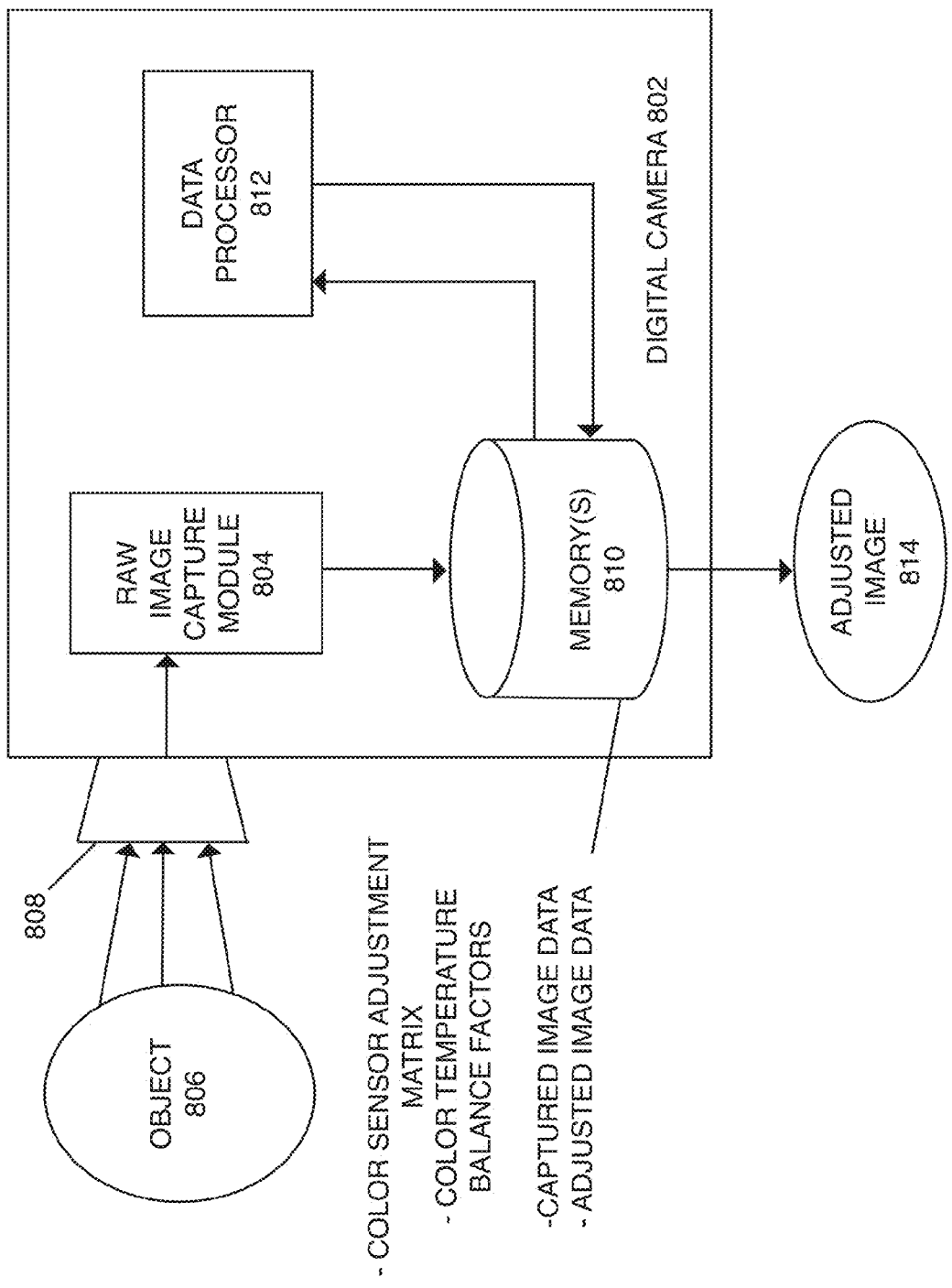
FIG. 8 is a block diagram depicting a digital camera.

FIG. 8 is a block diagram depicting a digital camera. A digital camera 802 includes a raw image capture module 804 that captures an image of an object 806 through a lens 808 and stores the captured image in a memory 810. A data processor 812 is configured to interact with the memory to adjust the captured image. The data processor 812 is configured access a color sensor adjustment matrix stored in a memory 810 of the digital camera 802 to perform a color adjustment transformation on the captured image. The data processor 812 is further configured to access one or more color temperature balance factors stored in a memory of the digital camera 802 and to use those balance factors to perform a white balancing adjustment on the captured image. The adjusted image data is stored to a memory 810 of the digital camera 810, where an adjusted image 814 is accessible to a user (e.g., for viewing on a display of the digital camera 802, for viewing on an external computer system, for printing, and for otherwise exporting).

This application uses examples to illustrate the invention. The patentable scope of the invention includes other examples.

What is claimed is:

1. A method, comprising:
   capturing, by an image capture device, first pixel values of a first calibration image illuminated by first color temperature light, wherein the first calibration image has first known pixel values;
   determining a color sensor adjustment matrix that, when multiplied by the captured first pixel values, yields the first known pixel values;
   capturing, by the image capture device, second pixel values of a second calibration image illuminated by a a second color temperature light different than the first color temperature light, wherein the first calibration image has second known pixel values;
   multiplying the second pixel values by the color sensor adjustment matrix to yield adjusted second pixel values; and
   determining a color temperature balance factor that, when multiplied by the adjusted second pixel values, yields the second known pixel values.

2. The method of claim 1, wherein the first calibration image includes a plurality of panels, wherein each of the panels is associated with a red baseline pixel value, a green baseline pixel value, and a blue baseline pixel value;
   wherein the first pixel values are used to determine a red observed pixel value, a green observed pixel value, and a blue observed pixel value for each of the panels;
   wherein the color sensor adjustment matrix is based upon the red, green, and blue baseline pixel values and the red, green, and blue observed pixel values.

3. The method of claim 2, wherein the color sensor adjustment matrix is determined according to:

$O = P \times A$, where O is a matrix containing the red, green, and blue baseline pixel values;
   where P is a matrix containing the red, green, and blue observed pixel values; and
   where A is the color sensor adjustment matrix.

4. The method of claim 3, wherein A is determined by calculating:

$A = (P^T \times P)^{-1} \times P^T \times O$.

5. The method of claim 4, wherein the adjusted second pixel values are determined according to:

$S = P_S \times A$, where $P_S$ is a matrix containing data based on the second pixel values; and
   where S is the adjusted second pixel values.

6. The method of claim 1, wherein the color temperature balance factor includes a red adjustment factor, a green adjustment factor, and a blue adjustment factor, wherein data associated with particular pixel in the captured image is adjusted based on the red adjustment factor, the green adjustment factor, and the blue adjustment factor.

7. The method of claim 6, further comprising:
   storing the color temperature balance factor in a memory of a digital camera.

8. The method of claim 7, wherein the first pixel values and the second pixel values are captured using the digital camera.

9. The method of claim 1, wherein the first calibration image and the second calibration image are the same image.

10. The method of claim 1, wherein the first calibration image includes a plurality of panels, wherein the plurality of panels each include a different color.

11. The method of claim 1, wherein the second calibration image includes a plurality of panels, wherein the plurality of panels include a plurality of grayscale colors.

12. An apparatus, comprising:
    a raw image capture module configured to capture image data based on a command;
    a memory, wherein the memory contains:
       a color sensor adjustment matrix derived from captured first pixel values of a first calibration image illuminated by first color temperature light, wherein the first calibration image has first known pixel values, and wherein the color sensor adjustment matrix is configured to, when multiplied by first pixel values, yield first known pixel values of the first calibration image
       a color temperature balance factor derived by (i) capturing second pixel values of a second calibration image illuminated by a second color temperature light, the second color temperature light being different than the first color temperature light, (ii) multiplying the second pixel values by the color sensor adjustment matrix to yield adjusted second pixel values, and (iii) determining the color temperature balance factor that, when multiplied by the adjusted second pixel values, yields the second known pixel values; and
    a data processor configured to adjust image data captured by the raw image capture module based on the color temperature balance factor and the color sensor adjustment matrix.

13. The apparatus of claim 12 wherein the memory further contains a second color temperature balance factor, wherein the second color temperature balance factor is based on captured third pixel values of the third calibration image illuminated by a third color temperature light;
    wherein the data processor is configured to adjust the image data captured by the raw image capture module based on both the first color temperature balance factor and the second color temperature balance factor.

14. The apparatus of claim 13, wherein the color sensor adjustment matrix is determined by calculating:

$A = (P^T \times P)^{-1} \times P^T \times O$.

where O is a matrix containing the red, green, and blue baseline pixel values;
    where P is a matrix containing the red, green, and blue observed pixel values;
    where A is the color sensor adjustment matrix.

15. The apparatus of claim 12, wherein the data processor is configured to store the adjusted mage data in the memory.

16. The apparatus of claim 12, further comprising a lens, wherein the raw image capture module is configured to capture the image based on light that enters the digital camera through the lens.

17. A method of adjusting a captured image, comprising:
receiving captured image data;
performing a color sensor adjustment of the captured image data using a color sensor adjustment matrix derived from captured first pixel values of a first calibration image illuminated by first color temperature light, wherein the first calibration image has first known pixel values, and wherein the color sensor adjustment matrix is configured to, when multiplied by first pixel values, yield first known pixel values of the first calibration image
performing a white balance adjustment of the captured image data using a color temperature balance factor derived by (i) capturing second pixel values of a second calibration image illuminated by a second color temperature light, the second color temperature light being different than the first color temperature light, (ii) multiplying the second pixel values by the color sensor adjustment matrix to yield adjusted second pixel values, and (iii) determining the color temperature balance factor that, when multiplied by the adjusted second pixel values, yields the second known pixel values; and
saving the adjusted captured image data in a computer-readable memory.

18. The method of claim 17, wherein the first calibration image included a plurality of panels, wherein each of the panels is associated with a red baseline pixel value, a green baseline pixel value, and a blue baseline pixel value;
wherein the first pixel values were used to determine a red observed pixel value, a green observed pixel value, and a blue observed pixel value for each of the panels;
wherein the color sensor adjustment matrix is based upon the red, green, and blue baseline pixel values and the red, green, and blue observed pixel values.

19. The method of claim 18, wherein the color sensor adjustment matrix was determined according to:

$$O = P \times A,$$

where O is a matrix containing the red, green, and blue baseline pixel values;
where P is a matrix containing the red, green, and blue observed pixel values; and
where A is the color sensor adjustment matrix.

20. The method of claim 19, wherein A was determined by calculating:

$$A = (P^T \times P)^{-1} \times P^T \times O.$$

21. The method of claim 20, wherein the adjusted second pixel values were determined according to:

$$S = P_S \times A,$$

where $P_S$ is a matrix containing data based on the second pixel values; and
where S is the adjusted second pixel values.

22. The method of claim 17, wherein the color temperature balance factor includes a red adjustment factor, a green adjustment factor, and a blue adjustment factor, wherein data associated with a particular pixel in the captured image data is adjusted based on the red adjustment factor, the green adjustment factor, and the blue adjustment factor.

23. The method of claim 17, wherein the color temperature balance factor is a first color temperature balance factor, wherein the white balance adjustment is performed using the first color temperature balance factor and a second color temperature balance factor.

24. The method of claim 23, wherein performing the white balance adjustment further comprises:
detecting an image light temperature based on the captured image data;
determining an interpolated color temperature balance factor based on the image light temperature, the first color temperature balance factor, and the second color temperature balance factor; and
performing the white balance adjustment based on the interpolated color temperature balance factor.

25. The method of claim 1, further comprising:
capturing, by the image capture device, third pixel values of a first non-calibration image illuminated by the first color temperature light;
multiplying the captured third pixel values by the color sensor adjustment matrix to yield adjusted third pixel values;
capturing, by the image capture device, fourth pixel values of a second non-calibration image illuminated by the second color temperature light; and
multiplying the captured fourth pixel values by both the color sensor adjustment matrix and the color temperature balance factor to yield adjusted fourth pixel values.

26. The method of claim 1, further comprising:
capturing, by the image capture device, third pixel values of a non-calibration image, illuminated by third color temperature light different than the first color temperature light and the second color temperature light;
interpolating a derived color temperature balance factor for the third color temperature based on (i) the color temperature balance factor calculated for the second color temperature light and (ii) a color temperature balance factor calculated for a fourth color temperature light; and
multiplying the captured third pixel values by both the color sensor adjustment matrix and the interpolated color temperature balance factor to yield adjusted third pixel values.

27. The method of claim 1, wherein the determining of the color sensor adjustment matrix and the determining of the color temperature balance factor are performed by the image capture device.

* * * * *